Patented May 7, 1935

2,000,602

UNITED STATES PATENT OFFICE 2,000,602

PROCESS FOR THE FIBROUS ESTERIFICATION OF CELLULOSE

Carl J. Malm and Charles L. Fletcher, Rochester, N. Y., assignors to Eastman Kodak Company, Rochester, N. Y., a corporation of New York No Drawing. Application February 2, 1932, Serial No. 590,509

11 Claims. (Cl. 260—101)

The present invention relates to the fibrous esterification of cellulose in which an ether having a boiling point higher than 70° C., is employed as a non-solvent or diluent in the esterification bath.

Processes for the esterification of cellulose may be broadly divided into the two classes of (1) the dope-forming and (2) the fibrous or non dope-forming types. At the present time the first class of processes are employed almost to the exclusion of the second. This lack of use of fibrous cellulose esterification processes may be partly due to the fact that the esters prepared by the dope-forming processes as a rule exhibit better qualities such as better stability to heat and deterioration than the products usually prepared by fibrous esterification processes. However the preparation of cellulose esters by dope-forming processes involves the additional step of precipitation after the esterification (and in some cases an additional hydrolysis treatment has taken place) but in fibrous esterification processes, on the other hand, such a step is entirely unnecessary. It may thus be seen that a process for the fibrous esterification of cellulose is most desirable, providing a cellulose ester may be prepared by that process which is comparable to that prepared by the dope-forming processes now employed. By our present invention, particularly when perchloric acid which is soluble in the higher boiling ethers is employed as a catalyst, a cellulose ester is produced having good stability which ester may be employed in the various capacities in which cellulose esters prepared by dope-forming processes are now employed as will be more fully pointed out hereinafter.

The non-solvents commonly employed at the present time in reaction mixtures for the fibrous esterification of cellulose are benzene and carbon tetrachloride. The high boiling ethers however exhibit a solvent action lower than that of benzene and carbon tetrachloride especially in the case of the mixed and higher esters of cellulose and consequently these ethers are required in much less amounts than either benzene or carbon tetrachloride to obtain the same non-solvent effect in the preparation of fibrous esterification baths. Also benzene and carbon tetrachloride due to their toxity have a decidedly detrimental physiological effect on the human system when either of them are employed in sufficient quantities so that the surrounding air becomes contaminated with their vapors. The higher ethers which we employ, on the other hand, are much less toxic and have lower vapor pressures than the commonly employed non-solvents so that any danger of the poisoning of workmen is reduced to a minimum by carrying out the esterification process according to our invention.

Rather readily hydrolyzed, carbon tetrachloride has always had a more or less corrosive action on metals with which it contacted. This danger is eliminated by our invention as far as the corrosion of metal by the non-solvent employed in the fibrous esterification of cellulose is concerned as the higher ethers have no chemical action, as far as can be determined, on the metals commonly employed for the reaction vessels in which cellulose esterification processes are performed.

The use of an ethyl ether or isopropyl ether each of which have boiling points below 70° C., as non-solvents in the fibrous esterification of cellulose may even be suggested, however we have found that these compounds are not suitable for use as non-solvents or diluents in the esterification of cellulose due to their extreme volatility resulting in much waste of non-solvent, inflammability and the general difficulties inherent in their handling. Consequently although ethyl ether has long been known and has been employed as a precipitant for cellulose esters, other non-solvents such as benzene and carbon tetrachloride have been commonly employed in the processes for the fibrous esterification of cellulose. Although isopropyl ether is less volatile and more easily handled than ethyl ether, when it is employed as a non-solvent in the fibrous esterification of cellulose it appears to act as a buffer for the catalyst and a decelerant of the reaction when compared with the ethers boiling above 70° C. For example cellulose was completely esterified in 12 hours in a fibrous esterification bath in which a higher boiling ether was used as the diluent and in which either perchloric acid or sulfuric acid could be used as the catalyst. However when the same esterification was attempted except that isopropyl ether was employed as the diluent, it was found that the esterification of the cellulose was only partially completed even after a much longer period of esterification.

The above facts with regard to lower boiling ethers such as ethyl and isopropyl ethers would seem to indicate that the higher boiling ethers would be even less suitable for use as non-solvents in fibrous esterification baths as it is usually the case that the lower members of a homologous series of chemical compounds are more effective in a given instance than the higher members of the series. On the contrary however in the present instance we have found that the higher boiling ethers are eminently suitable for use as diluents in fibrous esterification baths even though the lower boiling members are of small value for that purpose at the present time and in fact we have even found that these higher boiling ethers are more suitable for use as diluents in those baths than benzene or carbon tetrachloride.

One object of our invention is to provide a fibrous esterification process for preparing cellulose esters in the presence of a higher boiling ether which does not decelerate the esterification and which is easily handled. Another object of our invention is to provide a process for the fibrous esterification of cellulose in which perchloric acid may be employed as a catalyst, thereby avoiding the danger of introducing sulfate groups into the cellulose. Another object of our invention is to provide a fibrous process for preparing fully esterified cellulose esters in which a non-solvent is employed which is less harmful to the operation of the process than those now commonly used and which has no corrosive action on the metal of which the reaction vessels are made.

We have found that cellulose may be esterified up to and including the point of complete esterification in a reaction mixture in which an ether having a boiling point above 70° C., is employed. We have found that the conventional reaction mixtures for the esterification of cellulose containing an organic acid anhydrid and a small amount of catalyst may be employed in conjunction with a higher boiling ether for the fibrous esterification of cellulose.

We have found that by our invention due to the efficacy of the non-solvents which we employ, less quantities of non-solvent are necessary than are commonly employed in fibrous esterification processes. We have found that the esters prepared according to our invention are at least equal to and as a rule superior to the cellulose esters prepared by other fibrous esterification processes. In our process when sulfuric acid is used as a catalyst, it is usually employed in small amounts as the higher ethers which we use have no buffering effect on the catalyst making an excess amount of catalyst unnecessary, so that any danger from combined sulfur in the cellulose ester formed is reduced to a minimum which is not the case where an appreciable amount of sulfuric acid is present in the reaction bath.

However when perchloric acid or some other non-sulfuric catalyst is employed in an esterification process according to our invention the danger of any sulfation of the cellulose ester formed is completely eliminated.

Where the term "higher boiling ether" is employed herein it is to be understood as referring to ethers having a boiling point above 70° C.

Our invention broadly comprises the esterification of cellulose in an esterification bath in which a sufficient amount of a higher boiling ether to form a bath in which the cellulose ester to be prepared is insoluble, is employed.

The following examples are illustrative of processes which embody our invention but they are to be understood as in nowise limiting it:

*Example I*

50 lbs. of cotton linters was allowed to stand in a mixture of 300 lbs. of glacial acetic acid, 150 lbs. of normal propyl ether (b. p. 89°) and 4 lbs. of a mixture of 3 parts of phosphoric and 1 part of sulfuric acid, for about 4 hours at 80° F. 150 lbs. of acetic anhydrid (85%) containing slightly less than a pound of sulfuric acid was then added and the whole was maintained at a temperature of 100° F. for 12 hours. The fibrous cellulose acetate formed was separated from its reaction bath, was washed with n-propyl ether until all acid was removed and was then dried. It was found to be soluble in chloroform-alcohol which indicates a completely acetylated cellulose.

*Example II*

The same procedure was followed as in the preceding example except that propionic acid was employed instead of the acetic acid in the pretreatment in that example. A cellulose acetate-propionate was obtained which was soluble in solvents such as acetone, ethylene chloride etc. without the need of hydrolysis, making possible the formation of films, filaments, etc. from an unhydrolyzed ester of cellulose.

*Example III*

50 lbs. of cotton linters was pretreated with a mixture of 300 lbs. of butyric acid, 150 lbs. of normal butyl ether (b. p. 142° C.) and 5 ounces of 70% perchloric acid for 4 hours at 80° F. A mixture of 150 lbs. of acetic anhydrid (85%) and 8 ounces of perchloric acid (70%) was then added to the mass and the whole was maintained at 100° F. for 4 days. The product formed was then separated from its reaction bath, washed with an ether and dried. It was a cellulose acetate-butyrate and was found to be soluble in acetone and to have unusual stability to heat and hydrolysis compared to fibrous cellulose esters prepared by the commonly known fibrous esterification processes.

*Example IV*

50 lbs. of cotton linters was pretreated with a mixture of 300 lbs. of acetic acid, 150 lbs. of normal propyl ether and 5 ounces of perchloric acid (70%) for 4 hours at 80° F. A mixture of 150 lbs. of 85% acetic anhydrid and 8 ounces of perchloric acid (70%) was then added to the mass and the whole was maintained at 100° F. for 18 hours. A cellulose acetate was formed which showed much greater stability to heat than a fibrous cellulose acetate prepared in the customary manner.

As pointed out above, the ethers having a boiling point above 70° C., especially the aliphatic ethers, may be employed as the non-solvent in the esterification of cellulose. Some of the ethers which we have found particularly suitable are the n-propyl, n-butyl, iso-butyl, iso-amyl and n-amyl ethers.

It is an important feature of our invention that the esterification processes in accordance therewith may be carried out in the presence of only a relatively small amount of catalyst. We have found that processes in which an appreciable amount of catalyst such as sulfuric acid is employed result in a product of little if any value. The large amount of catalyst in such processes apparently has a marked degrading action on the cellulose which may even result in the conversion of the cellulose to a cellobiose or some other compound resulting from the degradation of cellulose.

Cotton linters is specified as the starting material in the examples as, due to its economy and satisfactory susceptibility to esterification, it is usually employed in the preparation of cellulose esters at the present time, however other cellulosic materials may also be employed in this connection. For example such materials as cotton fiber tissue paper, clean cotton, surgical cotton wool (preferably bleached) and carefully prepared sulfite wood pulp which has been bleached may be employed as the starting material. Also easily esterifiable cellulosic materials such as so-called hydrocellulose, reverted cellulose such as may be derived from the viscose or cuprammonium process and even cellulose nitrates, acetates, formates or ethers, which contain free hydroxyl groups available for esterification by processes carried out according to our invention, are also suitable as the starting material of our process of preparing cellulose esters. The term "cellulosic material" as employed herein refers to materials comprising either celluluose none of whose hydroxyl groups have been replaced or cellulose which has been partially esterified or etherified but which still contains free and esterifiable hydroxyl groups. For example a cellulose acetate-propionate may be formed by employing as a starting material a cellulose acetate which has been hydrolyzed down to an acetyl content of say about 35–39%, in a propionation bath such as one in which propionic acid and propionic anhydrid would be employed together with a higher boiling ether according to our invention.

The various conditions for carrying out the esterification of cellulose according to our invention may be varied in accordance with the judgment of the individual operator. For example the selection of temperatures, proportions, catalysts, time of treatment, etc. is merely a matter of technique and any such variations are possible in processes within the scope of our invention. Various other modifications such as the employment of various anhydrides and acids are apparent to those skilled in the art. For example a substituted fatty acid anhydrid such as a chloracetic anhydride or an alkoxyacetic (such as methoxy- or ethoxy-acetic) anhydride as disclosed in Clarke and Malm application Serial No. 179,177, now Patent No. 1,880,808, Oct. 4, 1932 may be employed instead of or supplementary to the unsubstituted anhydrides and/or substituted fatty acids such as chloracetic or alkoxyacetic acid may be employed instead of or supplementary to the unsubstituted acids providing only that a source of acyl groups be present in the reaction mixture.

What we hereby claim as our invention and desire to secure by Letters Patent of the United States is:

1. The fibrous esterification of cellulosic material in a bath containing as a catalyst, perchloric acid and a sufficient amount of an aliphatic ether having a boiling point above 70° C. to prevent solution of the ester formed therein.

2. A process of preparing a cellulose ester in fibrous form which comprises reacting upon the cellulose in a bath containing acetic anhydrid, an organic acid and an aliphatic ether having a boiling point above 70° C.

3. A process of preparing a cellulose ester in fibrous form which comprises reacting upon the cellulose in an esterifying bath containing an aliphatic ether having a boiling point above 70° C.

4. A process of preparing a cellulose ester in fibrous form which comprises reacting upon the cellulose in an esterifying bath containing as a catalyst, perchloric acid and an aliphatic ether having a boiling point above 70° C.

5. A process of preparing cellulose acetate in fibrous form which comprises reacting upon the cellulose in a bath containing acetic anhydrid, acetic acid and an aliphatic ether having a boiling point above 70° C.

6. The fibrous esterification of cellulose in a bath containing a sufficient amount of normal propyl ether to prevent solution of the ester formed therein.

7. The fibrous esterification of cellulose in a bath containing a sufficient amount of normal butyl ether to prevent solution of the ester formed therein.

8. The fibrous esterification of cellulose in a bath containing a sufficient amount of iso-amyl ether to prevent solution of the ester formed therein.

9. A process of preparing a cellulose ester in fibrous form in an esterifying bath containing acetic anhydride, an organic acid, perchloric acid as a catalyst and an aliphatic ether having a boiling point above 70° C.

10. A process of preparing cellulose acetate in fibrous form in an esterifying bath containing acetic anhydride, acetic acid, perchloric acid as a catalyst, and an aliphatic ether having a boiling point above 70° C.

11. A process of preparing cellulose acetate in fibrous form in an esterifying bath containing acetic anhydride, acetic acid, perchloric acid as a catalyst, and a normal propyl ether.

CARL J. MALM.
CHARLES L. FLETCHER.